United States Patent
Castelli et al.

(10) Patent No.: US 10,040,446 B2
(45) Date of Patent: Aug. 7, 2018

(54) REDUCING NOISE GENERATED BY A MOTORIZED DEVICE

(71) Applicant: International Business Machines Corporation, Armonk, NY (US)

(72) Inventors: Vitorrio Castelli, Croton on Hudson, NY (US); Martin Franz, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 84 days.

(21) Appl. No.: 15/331,968

(22) Filed: Oct. 24, 2016

(65) Prior Publication Data

US 2018/0111603 A1    Apr. 26, 2018

(51) Int. Cl.
*B60W 20/40* (2016.01)
*G05D 19/02* (2006.01)

(52) U.S. Cl.
CPC .............. *B60W 20/40* (2013.01); *G05D 19/02* (2013.01); *B60W 2710/0644* (2013.01); *B60W 2710/08* (2013.01)

(58) Field of Classification Search
CPC ......... B60W 20/40; B60W 2710/0644; B60W 2710/08; G05D 19/02
See application file for complete search history.

(56) References Cited

U.S. PATENT DOCUMENTS

| | | | | |
|---|---|---|---|---|
| 4,940,914 A * | 7/1990 | Mizuno | ................. | F16F 15/005 310/316.01 |
| 5,097,923 A * | 3/1992 | Ziegler | ................... | F01N 1/065 181/206 |
| 5,170,433 A * | 12/1992 | Elliott | .................. | G10K 11/178 704/226 |
| 5,182,774 A | 1/1993 | Bourk | | |
| 5,189,266 A * | 2/1993 | Sasaki | ....................... | F01N 1/16 181/227 |
| 5,332,061 A * | 7/1994 | Majeed | ................ | B60K 5/1283 180/312 |
| 5,384,853 A * | 1/1995 | Kinoshita | ............ | G10K 11/178 381/71.12 |
| 5,568,557 A * | 10/1996 | Ross | .................. | G10K 11/1788 381/71.11 |

(Continued)

OTHER PUBLICATIONS

P. Mell et al., "The NIST Definition of Cloud Computing", National Institute of Standards and Technology, Information Technology Laboratory, Sep. 2011, pp. 1-7.

*Primary Examiner* — Calvin Cheung
(74) *Attorney, Agent, or Firm* — Law Office of Jim Boice

(57) ABSTRACT

A method, system, and/or computer program product mitigate sympathetic resonance in a structure that is physically proximate to a machine. One or more processors, based on readings from a sound sensor associated with a machine, detect a sound generated by a machine component of the machine. One or more processors, based on readings from a resonance sensor, detect vibration caused by sympathetic resonance in a structure that is physically proximate to the machine, where the sympathetic resonance is caused by the sound generated by the machine component. One or more processors then direct a machine component controller to adjust the machine component in order to mitigate the sympathetic resonance in the structure that is physically proximate to the machine.

25 Claims, 7 Drawing Sheets

(56) References Cited

U.S. PATENT DOCUMENTS

| | | | | |
|---|---|---|---|---|
| 5,734,246 A * | 3/1998 | Falangas | | B64G 1/38 |
| | | | | 248/559 |
| 5,792,948 A * | 8/1998 | Aoki | | F16F 15/027 |
| | | | | 700/280 |
| 5,802,184 A * | 9/1998 | Heath | | F16F 7/1011 |
| | | | | 381/71.4 |
| 5,816,122 A * | 10/1998 | Benning | | F16F 15/02 |
| | | | | 408/11 |
| 5,828,759 A | 10/1998 | Everingham | | |
| 5,845,236 A * | 12/1998 | Jolly | | F16F 7/1011 |
| | | | | 248/550 |
| 6,002,778 A * | 12/1999 | Rossetti | | G10K 11/178 |
| | | | | 381/71.4 |
| 6,138,947 A * | 10/2000 | Welsh | | G10K 11/1788 |
| | | | | 244/1 N |
| 6,186,485 B1 * | 2/2001 | Kawazoe | | B60K 5/1216 |
| | | | | 267/140.14 |
| 8,532,828 B2 * | 9/2013 | Schramm | | F16H 57/0006 |
| | | | | 700/280 |
| 8,960,323 B2 * | 2/2015 | Oberheim | | B23D 51/02 |
| | | | | 16/431 |
| 9,878,781 B2 * | 1/2018 | Swanson | | B64C 27/001 |
| 2003/0047395 A1 * | 3/2003 | Patton | | F16F 15/005 |
| | | | | 188/266.7 |
| 2007/0212939 A1 * | 9/2007 | Melz | | F16F 15/00 |
| | | | | 439/589 |
| 2007/0223714 A1 | 9/2007 | Nishikawa | | |
| 2008/0134787 A1 * | 6/2008 | Asahara | | F16F 7/1005 |
| | | | | 73/526 |
| 2010/0204881 A1 * | 8/2010 | Muragishi | | F16F 7/1005 |
| | | | | 701/36 |
| 2011/0272229 A1 * | 11/2011 | Kobayashi | | F16F 7/1011 |
| | | | | 188/379 |
| 2012/0036979 A1 * | 2/2012 | Griego | | G10D 7/10 |
| | | | | 84/398 |
| 2014/0306706 A1 * | 10/2014 | Lazar | | G01R 33/288 |
| | | | | 324/309 |
| 2014/0354112 A1 * | 12/2014 | Rocha | | F16F 15/007 |
| | | | | 310/319 |
| 2015/0032332 A1 * | 1/2015 | Kikuchi | | B60W 10/22 |
| | | | | 701/37 |
| 2015/0100221 A1 * | 4/2015 | Routledge | | F01N 1/165 |
| | | | | 701/111 |
| 2015/0370266 A1 * | 12/2015 | Norris | | B64C 1/40 |
| | | | | 700/280 |
| 2016/0003626 A1 | 1/2016 | Trammell | | |
| 2016/0042731 A1 * | 2/2016 | Chang | | G10K 11/175 |
| | | | | 381/71.4 |
| 2016/0150313 A1 * | 5/2016 | Howard | | H04R 1/2803 |
| | | | | 381/71.4 |
| 2017/0334448 A1 * | 11/2017 | Schwunk | | B60W 30/20 |

* cited by examiner

REDUCING NOISE GENERATED BY A MOTORIZED DEVICE

BACKGROUND

The present disclosure relates to the field of motorized devices, and specifically to the noise generated by motorized devices. Still more specifically, the present disclosure relates to the field of managing noise generated by motorized devices by adjusting operational parameters of the motorized devices.

Noise generated by engines in motor vehicles, such as cars, buses and trucks, presents a major contribution of the overall noise level in urban areas. The impact of the vibrations generated by the vehicle's engine and wheels is in many cases emphasized by the elements of the surrounding environment (such as windows) resonating sympathetically with the original vibration source. Similarly, resonation noise presents a potential problem for any device containing a substantial rotating mass.

SUMMARY

A method, system, and/or computer program product in accordance with the present invention, includes features for mitigating sympathetic resonance in a structure that is physically proximate to a machine. In a system embodiment, one or more processors, based on readings from a sound sensor associated with a machine, detect a sound generated by a machine component of the machine. One or more processors, based on readings from a resonance sensor, detect vibration caused by sympathetic resonance in a structure that is physically proximate to the machine, where the sympathetic resonance is caused by the sound generated by the machine component. One or more processors then direct a machine component controller to adjust the machine component in order to mitigate the sympathetic resonance in the structure that is physically proximate to the machine.

In an embodiment of the present invention, a computer-implemented method mitigates sympathetic resonance by adjusting sound coming from a machine. One or more processors detect, based on readings from a sound sensor associated with the machine, a sound generated by a machine component of the machine. One or more processors detect, based on readings from a resonance sensor, vibration caused by sympathetic resonance in a structure that is physically proximate to the machine, where the sympathetic resonance is caused by the sound generated by the machine component. One or more processors direct a machine component controller to adjust the sound coming from machine component in order to mitigate the sympathetic resonance in the structure that is physically proximate to the machine.

In an embodiment of the present invention a computer-implemented method mitigates sympathetic resonance by adjusting sound coming from a vehicle. One or more processors detect, based on readings from a sound sensor associated with a vehicle, a sound generated by a vehicle. One or more processors detect, based on readings from a resonance sensor, vibration caused by sympathetic resonance in a structure that is physically proximate to the vehicle, where the sympathetic resonance is caused by the sound generated by the vehicle. One or more processors direct a vehicle controller to adjust an operation of the vehicle in order to mitigate the sympathetic resonance in the structure that is physically proximate to the vehicle.

DETAILED DESCRIPTION

Figure 1:
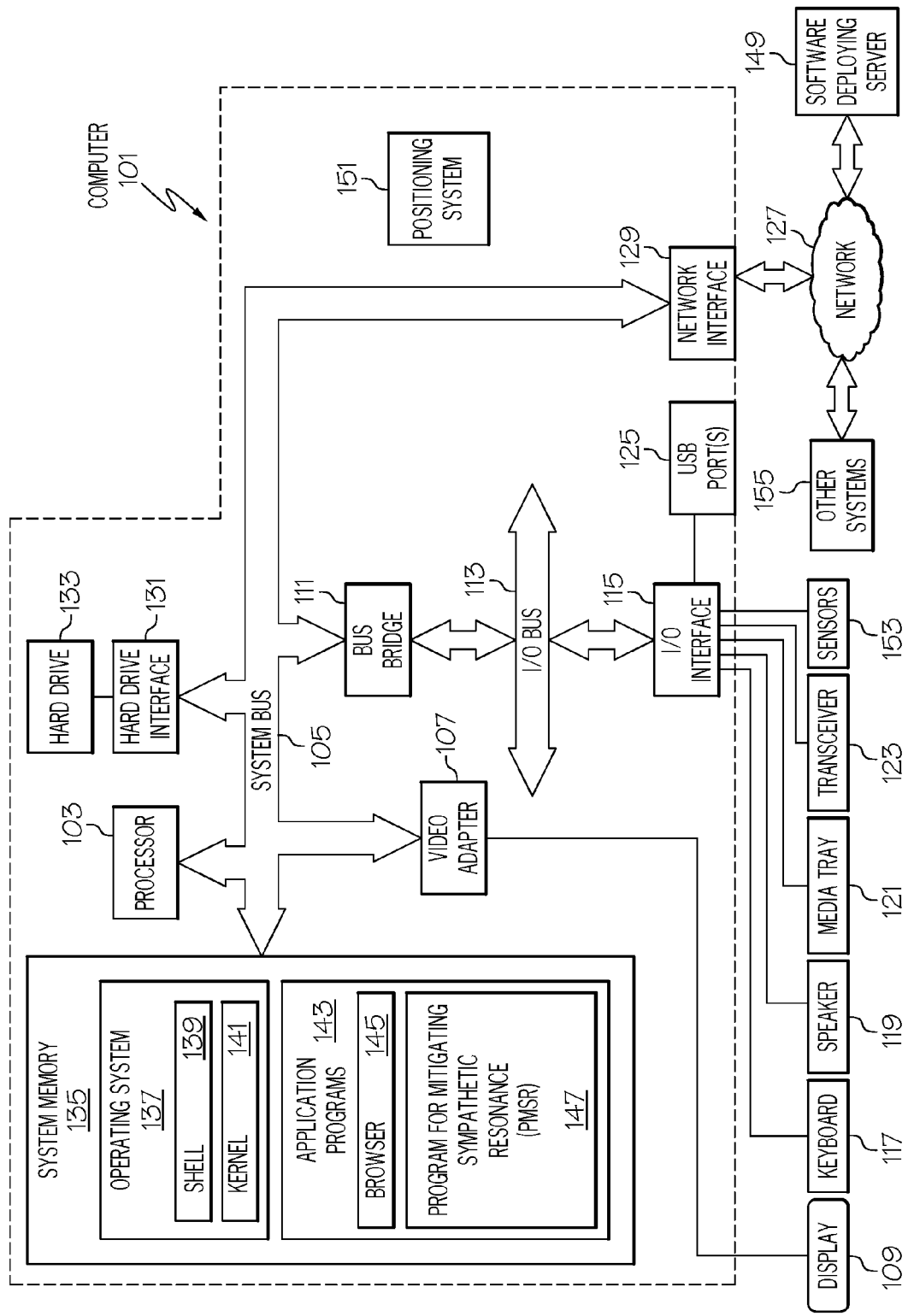
FIG. 1 depicts an exemplary system in accordance with one or more embodiments of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by software deploying server 149 and/or other systems 155 shown in FIG. 1, and/or machine component controller 301 shown in FIG. 3, and/or a self-driving vehicle (SDV) on-board computer 401 shown in FIG. 4.

Exemplary computer 101 includes a processor 103 that is coupled to a system bus 105. Processor 103 may utilize one or more processors, each of which has one or more processor cores. A video adapter 107, which drives/supports a display 109 (which may be a touch screen capable of receiving touch inputs), is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a speaker 119, a media tray 121 (which may include storage devices such as CD-ROM drives, multi-media interfaces, etc.), a transceiver 123 (capable of transmitting and/or receiving electronic communication signals), and external USB port(s) 125. While the format of the ports connected to I/O interface 115 may be any known to those skilled in the art of computer architecture, in one or more embodiments some or all of these ports are universal serial bus (USB) ports.

Figure 3:
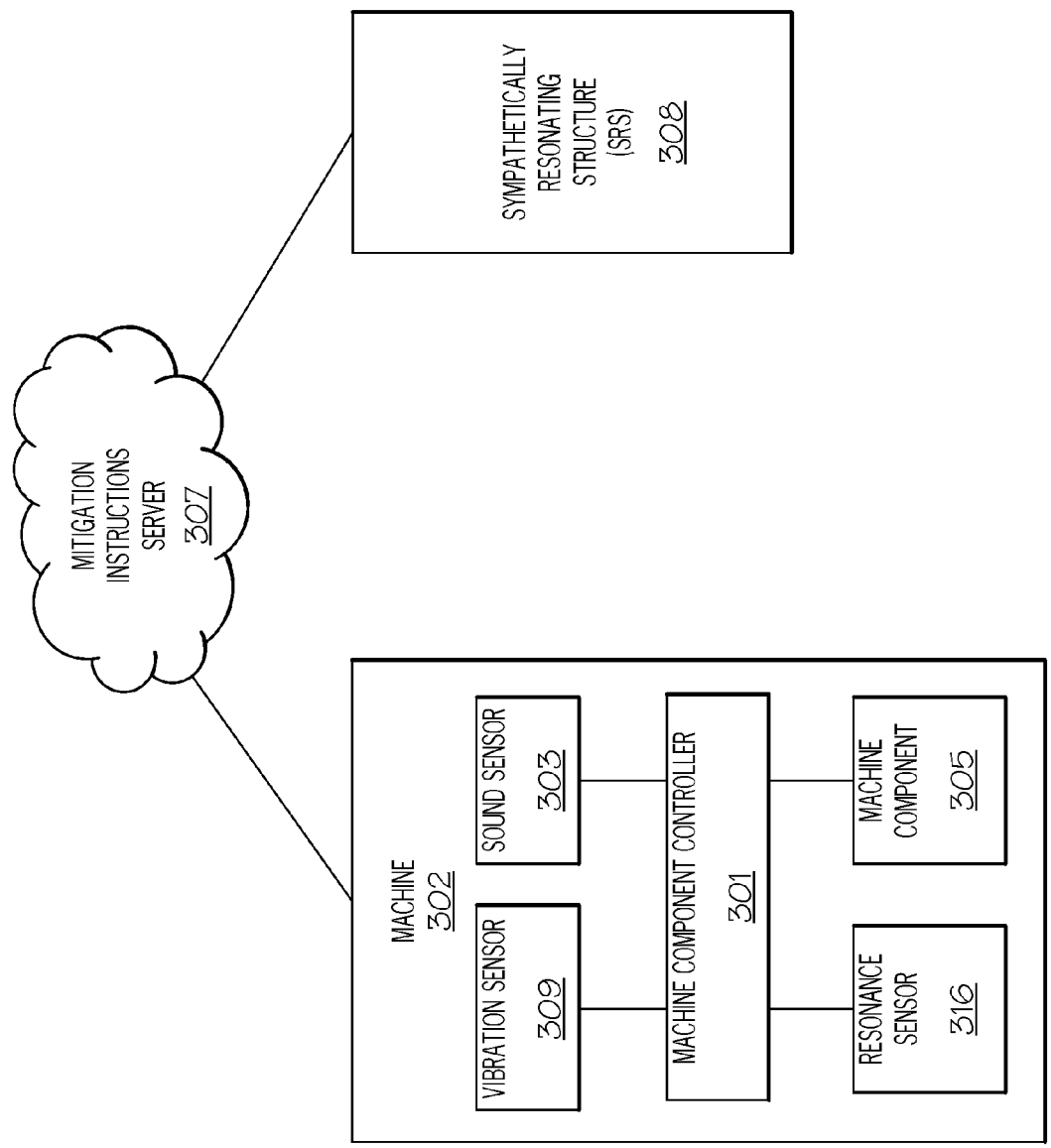
FIG. 3 depicts additional detail of equipment used to detect sympathetic resonance and to adjust a machine that generated the initial sound that caused the sympathetic resonance.

As depicted, computer 101 is able to communicate with a software deploying server 149 and/or other systems 155 (e.g., establishing communication between machine component controller 301 and cloud-based database server 305 shown in FIG. 3) using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one or more embodiments, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143.

Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include a program for mitigating sympathetic resonance (PMSR) 147. PMSR 147 includes computer readable/executable program code for implementing the processes described below, including those described in FIGS. 2-5. In one or more embodiments, computer 101 downloads PMSR 147 from software deploying server 149, "on-demand," wherein the code in PMSR 147 is not downloaded until needed for execution. In one or more embodiments of the present invention, software deploying server 149 performs all of the functions associated with the present invention (including execution of PMSR 147), thus freeing computer 101 from having to use its own internal computing resources to execute PMSR 147.

Also within computer 101 is a positioning system 151, which determines a real-time current location of computer 101 (particularly when part of a vehicle as described herein). Positioning system 151 may be a combination of accelerometers, speedometers, etc., or it may be a global positioning system (GPS) that utilizes space-based satellites to provide triangulated signals used to determine two-dimensional or three-dimensional locations.

Figure 4:
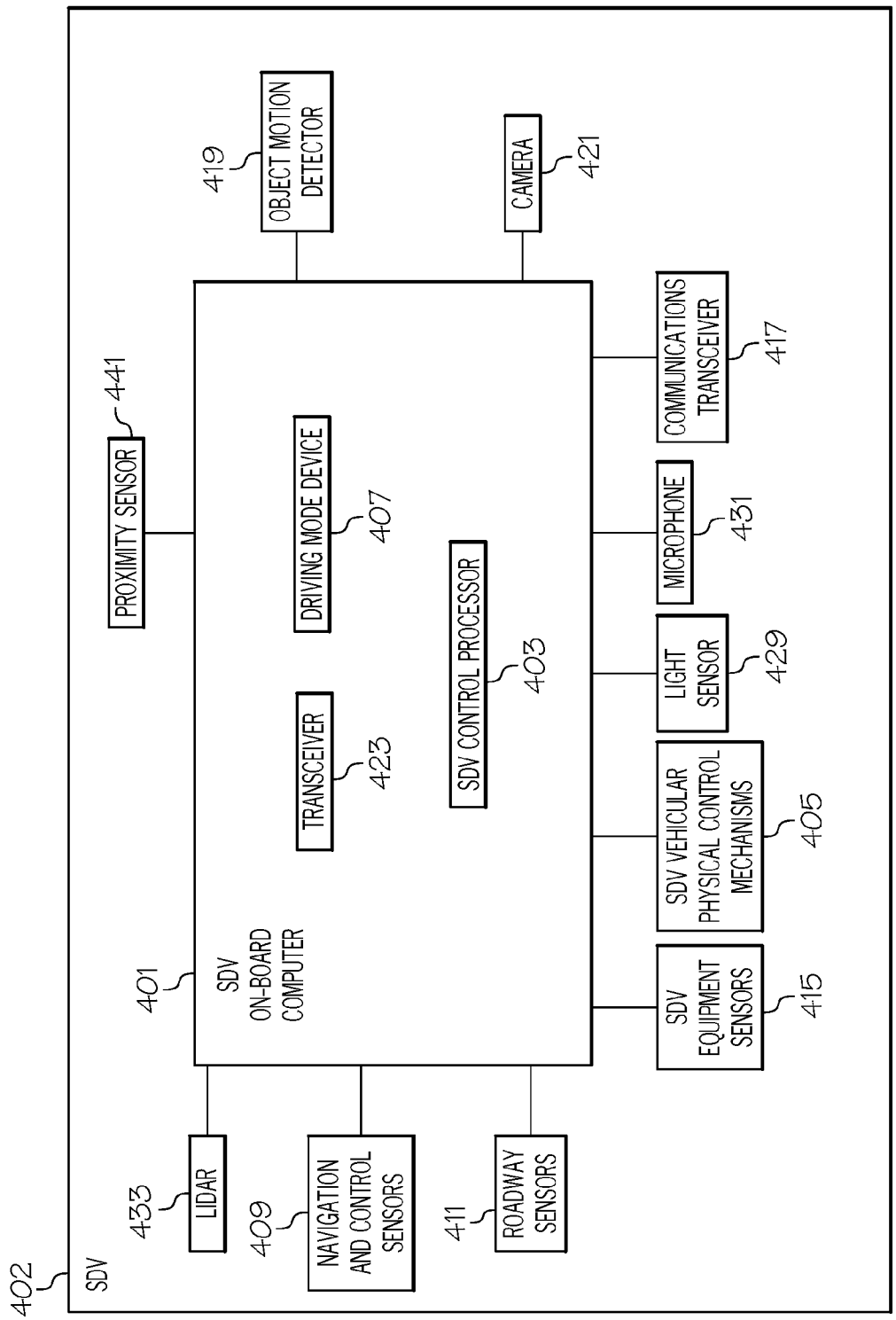
FIG. 4 illustrates detail of a self-driving vehicle (SDV) that may generate the initial sound that causes the sympathetic resonance.

Also associated with computer 101 are sensors 153, which detect an environment of the computer 101 when incorporated into a machine (e.g., as the machine component controller 301 shown in FIG. 3 and/or the SDV on-board computer 401 shown in FIG. 4). More specifically, when detecting the environment of a vehicle, sensors 153 are able to detect buildings, glass, mirrors, pavement, etc. near the vehicle. For example, if computer 101 is on board a self-driving vehicle (SDV), then sensors 153 may be cameras, radar transceivers, etc. that allow the SDV to detect the environment (e.g., other vehicles, road obstructions, pavement, etc.) of that SDV, thus enabling it to be autonomously self-driven. Similarly, sensors 153 may be cameras, thermometers, microphones (e.g., microphone 431 shown in FIG. 3), light sensors such as light sensor 429 shown in FIG. 4 for detecting laser light reflections (to indicate how much resonance is occurring on a structure), etc.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

The present invention presents an adaptive system, which 1) uses information from the environment surrounding the vehicle or other motorized equipment to identify the situations in which the vehicle's engine or another moving component triggers sympathetic resonance (vibration) in the surrounding environment, and 2) adjusts the operating conditions of the engine or vehicle's trajectory to avoid and/or mitigate the resonance-triggering frequency and/or loudness.

Figure 2:
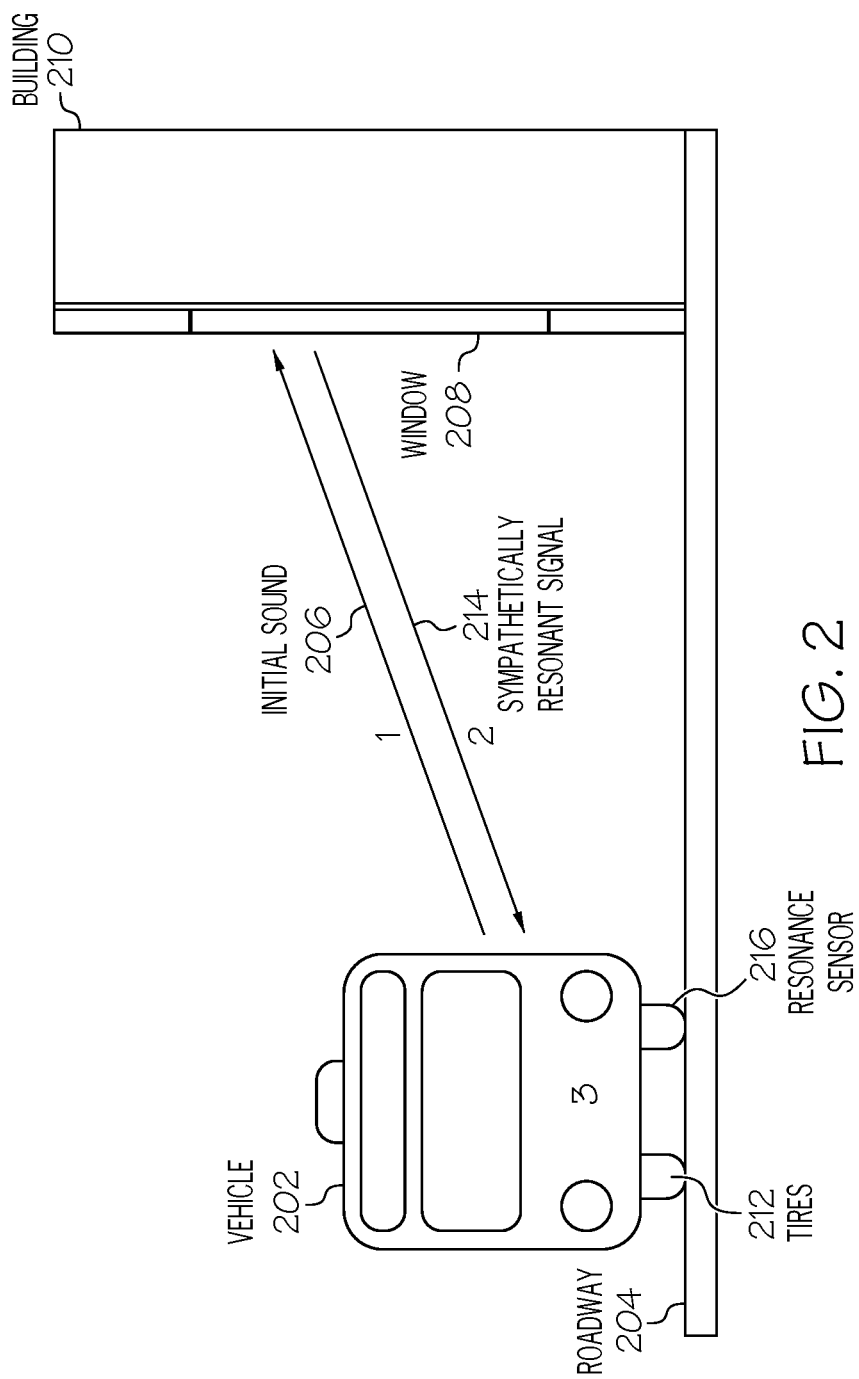
FIG. 2 illustrates an exemplary machine generating an initial sound that causes a nearby structure to sympathetically resonate.

For example, consider FIG. 2, which depicts a vehicle 202. As vehicle 202 travels (or is stationary, e.g. at a traffic signal) along a roadway 204, it produces an initial sound 206, which may strike a window 208 on a nearby building 210 (as indicated by arrow 1). This initial sound may be caused by the sound of the engine on the vehicle 202, the sound made by the tires 212 as they roll along the roadway 204, etc.

The initial sound 206 may cause the window 208 to sympathetically resonate. That is, certain materials and shapes of materials will respond to external vibrations by resonating with those external vibrations. For example, certain types, shapes, and thicknesses of glass will vibrate at a certain frequency when struck by sound of a particular frequency. The frequency at which the glass vibrates and the frequency of the sound that strikes the glass are usually not the same frequency, although (depending on the physical structure of the glass) may be the same frequency. The phenomenon of a passive object (e.g., a pane of glass on the side of a building) vibrating when struck by certain sound wave frequencies and/or intensities (e.g., noise from a passing bus) is known as sympathetic resonance or sympathetic vibration.

Thus, as shown in FIG. 2, when the initial sound 206 (noise made by the vehicle 202) strikes the window 208 on the nearby building 210, the window 208 starts to vibrate, thus creating a sympathetically resonant signal 214, which is detected by a resonance sensor 216 on the vehicle 202 (as indicated by arrow 2).

Logic within the vehicle 202 will then adjust the operation of the vehicle 202 (as indicated by the numeral 3), in order to alter the initial sound 206 coming from the vehicle 202, thereby mitigating the vibration of the window 208.

The sympathetically resonant signal 214 may be sound or light.

For example, the resonance sensor 216 may be a directional microphone that picks up the sounds generated by the window 208 as it sympathetically vibrates in response to being hit by the initial sound 206.

Alternatively, the resonance sensor 216 may be a laser Doppler vibrometer that 1) shoots coherent light at the window 208, receives back an echo laser signal from the vibrating window 208, and then measures the Doppler shift (i.e., change in light frequency) as the laser signal is returned from the window 208, thereby providing a fine measurement of how much window 208 is vibrating.

While FIG. 2 is shown as a vehicle 202 (e.g., a bus) causing a window 208 in a building 210 to vibrate, the present invention is also applicable to any machine (e.g., a pump, a stationary engine, etc.) that is causing another passive object (e.g., glass on a building, walls in a structure, windows on passing cars, etc.) to sympathetically vibrate (as described above), thus 1) generating additional noise and/or 2) causing the structure of the passive object to progressively weaken due to the imposed vibration.

Continuing with the example shown in FIG. 2, the present invention may be utilized with a vehicle 202 that is a hybrid vehicle or a self-driving vehicle (SDV).

For example, assume that vehicle 202 is a hybrid fuel-electric vehicle. Assume further that when being propelled with a combustion engine, initial sound 206 is of a frequency and/or intensity (strength) that causes window 208 to sympathetically vibrate. Thus, once the resonance sensor 216 detects this sympathetic vibration, the hybrid vehicle 202 will switch over to use of on-board electric motors to propel the hybrid vehicle 202, thus generating much less noise (decreasing initial sound 206), such that window 208 stops sympathetically vibrating (and thus sympathetically resonant signal 214 is reduced, or even eliminated). Thus, the operating conditions of the fuel engine in the vehicle 202 can be automatically adjusted without substantially changing the operation of the vehicle 202. Similarly, if a hybrid vehicle is stationary with its fuel engine running to recharge the battery, the engine's operating conditions (RPMs) may be changed or the engine switched off to avoid triggering the resonance.

Assume now that vehicle 202 is an autonomous or semi-autonomous vehicle, in which the vehicle's controller unit can quickly and precisely adjust both the operating conditions of the engine and the vehicle's trajectory within the lane or road travelled. That is, if vehicle 202 is a self-driving vehicle (SDV), the on-board logic within the SDV can automatically adjust not only the equipment on the SDV (e.g., switching from an internal combustion engine to an electric motor), but can also maneuver the SDV so that it is traveling on smoother (and thus quieter) sections of roadway 204.

Thus, as shown in FIG. 2, assume that a hybrid diesel-electric bus (depicted as vehicle 202) stops at an intersection with the engine running, charging the battery. The engine's noise triggers sympathetic resonance in a glass store front (i.e., window 208 of building 210). A device (e.g., resonance sensor 216) detects the sound produced by the resonating glass (due to sympathetic vibration caused by the initial sound 206), identifies that sound as being caused by the engine's noise, and sends a signal to the engine's control unit to adjust the engine's revolutions per minute (RPM) outside of the resonance triggering frequency range.

As mentioned above, vehicle 202 may be a self-driving vehicle (SDV). If so, then not only can on-board logic within the SDV adjust the noise-generating machine component (e.g., machine component 303 shown in FIG. 3), but can also adjust the speed, steering, etc. of the SDV.

With reference now to FIG. 3, consider machine 302, which may be a vehicle (as depicted in FIG. 2), a unit of stationary equipment (e.g., a pump), or any other device that produces an initial sound that is of a frequency and intensity to cause a sympathetic vibration in a sympathetically resonating structure (SRS) 308 (e.g., the window 208 shown in FIG. 2).

Within the machine 302 is a sound sensor 303, which detects sound coming from a certain machine component 305 (e.g., the engine of a vehicle, an engine on a pump, the tires on a vehicle rolling along pavement, etc.). A resonance sensor 316 (analogous to resonance sensor 216 shown in FIG. 2) will detect a sympathetically resonant signal (e.g., a sympathetically resonant signal 214 shown in FIG. 2) coming from the SRS 308. As described above, the sympathetically resonant signal may be the sound (as picked up by the resonance sensor 316 functioning as a microphone) or light (as picked up by the resonance sensor 316 functioning as a laser Doppler vibrometer) that is caused by the SRS 308 vibrating.

In one or more embodiments of the present invention, also associated with machine 302 (e.g., mounted on the chassis of vehicle 202) is a vibration sensor 309, which detects direct vibration (e.g., road vibration, engine vibration, etc.) in the machine 302.

A machine component controller 301 (architecturally analogous to computer 101 shown in FIG. 1) uses sensor readings from the sound sensor 303 (to detect what is causing the sound on the machine 302) and from the resonance sensor 316 (to detect that the SRS 308 is sympathetically vibrating) to adjust the operation of the machine component 305. That is, if the machine component 305 is the gas powered engine that is causing the SRS 308 to sympathetically vibrate, then the machine component controller 301 may slow down or speed up or turn off the gas powered engine, thereby reducing the amount of noise being generated by the gas powered engine.

Also shown in FIG. 3 is a mitigation instructions server 307, which supplies mitigation instructions (e.g., instructions to adjust the sound generated by machine 302) based on previous mitigation steps (successfully) taken by other machines in the past.

As indicated above, the machine 302 shown in FIG. 3 (and more specifically the vehicle 202 shown in FIG. 2) may be a self-driving vehicle.

With reference now to FIG. 4, details of one or more embodiments of an SDV 402 (i.e., vehicle 202 when configured as an SDV) are presented.

By way of overview, self-driving vehicles (SDVs) 402 (such as are depicted in FIG. 4) are vehicles that are able to autonomously drive themselves through private and/or public spaces. Using a system of sensors that detect the location and/or surroundings of the SDV, logic within or associated with the SDV controls the speed, propulsion, braking, and steering of the SDV based on the sensor-detected location and surroundings of the SDV.

As depicted in FIG. 4, SDV 402 has an SDV on-board computer 401 that controls operations of the SDV 402. According to directives from a driving mode device 407, the SDV 402 can be selectively operated in manual mode or autonomous mode. In one or more embodiments, driving mode device 407 is a dedicated hardware device that selectively directs the SDV on-board computer 401 to operate the SDV 402 in one of the autonomous modes or in the manual mode.

While in autonomous mode, SDV 402 operates without the input of a human driver, such that the engine, steering mechanism, braking system, horn, signals, etc. are controlled by the SDV control processor 403, which is now under the control of the SDV on-board computer 401. That is, by the SDV on-board computer 401 processing inputs taken from navigation and control sensors 409 and the driving mode device 407 (indicating that the SDV 402 is to be controlled autonomously), then driver inputs to the SDV control processor 403 and/or SDV vehicular physical control mechanisms 405 are no longer needed.

As just mentioned, the SDV on-board computer 401 uses outputs from navigation and control sensors 409 to control the SDV 402. Navigation and control sensors 409 include hardware sensors that 1) determine the location of the SDV 402; 2) sense other cars and/or obstacles and/or physical structures around SDV 402; 3) measure the speed and direction of the SDV 402; and 4) provide any other inputs needed to safely control the movement of the SDV 402.

With respect to the feature of 1) determining the location of the SDV 402, this can (in some embodiments) be achieved through the use of a system such as positioning system 151 shown in FIG. 1. Positioning system 151 may use a global positioning system (GPS), which uses space-based satellites that provide positioning signals that are triangulated by a GPS receiver to determine a 3-D geophysical position of the SDV 402. Positioning system 151 may also use, either alone or in conjunction with a GPS system, physical movement sensors such as accelerometers (which measure acceleration of a vehicle in any direction), speedometers (which measure the instantaneous speed of a vehicle), airflow meters (which measure the flow of air around a vehicle), etc. Such physical movement sensors may incorporate the use of semiconductor strain gauges, electromechanical gauges that take readings from drivetrain rotations, barometric sensors, etc.

With respect to the feature of 2) sensing other cars and/or obstacles and/or physical structures around SDV 402, the positioning system 151 may use radar or other electromagnetic energy that is emitted from an electromagnetic radiation transmitter (e.g., transceiver 423 shown in FIG. 4), bounced off a physical structure (e.g., a building, another car, etc.), and then received by an electromagnetic radiation receiver (e.g., transceiver 423). Without limitation, exemplary positioning systems within SDV 402 include a Light Detection and Ranging (LIDAR) system (e.g., LIDAR 433 shown in FIG. 4) and/or a Laser Detection and Ranging (LADAR) system that measures the time it takes to receive back the emitted electromagnetic radiation (e.g., light), and/or evaluate a Doppler shift (i.e., a change in frequency to the electromagnetic radiation that is caused by the relative movement of the SDV 402 to objects being interrogated by the electromagnetic radiation) in the received electromagnetic radiation from when it was transmitted, the presence and location of other physical objects can be ascertained by the SDV on-board computer 401. Thus, LIDAR 433 may use sensors and processes similar to the resonance sensor 316 when operating as a laser Doppler vibrometer.

With respect to the feature of 3) measuring the speed and direction of the SDV 402, this can be accomplished by taking readings from an on-board speedometer (not depicted) on the SDV 402 and/or detecting movements to the steering mechanism (also not depicted) on the SDV 402 and/or the positioning system 151 discussed above.

With respect to the feature of 4) providing any other inputs needed to safely control the movement of the SDV 402, such inputs include, but are not limited to, control signals to activate a horn, turning indicators, flashing emergency lights, etc. on the SDV 402.

In one or more embodiments of the present invention, SDV 402 includes roadway sensors 411 that are coupled to the SDV 402. Roadway sensors 411 may include sensors that are able to detect the amount of water, snow, ice, etc. on the roadway 204 shown in FIG. 2 (e.g., using cameras, heat sensors, moisture sensors, thermometers, etc.). Roadway sensors 411 also include sensors that are able to detect "rough" roadways (e.g., roadways having potholes, poorly maintained pavement, no paving, etc.) using cameras, vibration sensors, etc.

Similarly, a dedicated camera 421 can be trained on roadway 204, in order to provide photographic images of conditions on the roadway 204 upon which the SDV 402 is traveling.

A dedicated object motion detector 419 (e.g., the laser Doppler vibrometer described above) is able to detect motion in nearby structures such as the SRS 308 shown in FIG. 3.

In one or more embodiments of the present invention, also within the SDV 402 are SDV equipment sensors 415. SDV equipment sensors 415 may include cameras aimed at tires on the SDV 402 to detect how much tread is left on the tire. SDV equipment sensors 415 may include electronic sensors that detect how much padding is left of brake calipers on disk brakes. SDV equipment sensors 415 may include drivetrain sensors that detect operating conditions within an engine (e.g., power, speed, revolutions per minute—RPMs of the engine, timing, cylinder compression, coolant levels, engine temperature, oil pressure, etc.), the transmission (e.g., transmission fluid level, conditions of the clutch, gears, etc.), etc. SDV equipment sensors 415 may include sensors that detect the condition of other components of the SDV 402, including lights (e.g., using circuitry that detects if a bulb is broken), wipers (e.g., using circuitry that detects a faulty wiper blade, wiper motor, etc.), etc.

In one or more embodiments of the present invention, also within SDV 402 is a communications transceiver 417, which is able to receive and transmit electronic communication signals (e.g., RF messages) from and to other communications transceivers found in other vehicles, servers, monitoring systems, etc.

In one or more embodiments of the present invention, also within SDV 402 is a proximity sensor 441, which uses motion detectors, radar (using Doppler shifting logic), etc. that detect an object (e.g., a vehicle in a next lane, a building, etc.) near SDV 402.

Thus, as described herein, sound produced by a resonating mass (e.g., the window 208 shown in FIG. 2) is a) detected (by microphone(s), or indirectly by Doppler vibrometer); and b) identified as caused by the engine's noise (also using vehicle characteristics, location information, etc.). Engine operating conditions (e.g. rpms) are adjusted (e.g., as facilitated by CVT, fuel-electric hybrid, autonomous vehicle).

While the present invention has been primarily described herein with regard to internal combustion engines, it may also be used on any machine, equipment or device that a) generates noise that potentially resonates in the surrounding environment b) allows changing operating parameters to avoid the resonance-triggering frequency, e.g. any device including a substantial rotating mass.

The processing unit (e.g., machine component controller 301) is able to provide a sympathetic resonance identification using algorithms/models using data from 1) same/similar vehicle, 2) same/similar environment, 3) dynamically/collaboratively updated database Referring again to FIG. 3, the processing unit (e.g., machine component controller 301 when part of a vehicle), which can optionally be implemented as part of the vehicle's control unit (e.g., for accelerating, braking, steering the vehicle): a) Evaluates the signal from the measuring devices; b) Identifies the situations in which the vehicle's engine or wheels, or other component of the controlled device triggers sympathetic resonance in the surrounding environment; and then c) Initiates a mitigating action, which may include: i) changing the operating conditions of the vehicle's engine and/or transmission, (e.g. adjusting engine frequency of rotation (rpm), changing the transmission ratio); ii) in the case of and autonomous or semi-autonomous vehicle, adjusting the vehicle's trajectory within the lane or road travelled to avoid resonance-inducing road imperfections; iii) in the case of a hybrid fuel/electric vehicle, changing the operating mode with respect to the fuel/electric power use ratio; and iv) in the case of a device including a rotating mass (ventilator, washing machine), changing the frequency of rotation of the mass involved.

Mitigating actions include: Adjusting engine rpms (CVT ratio, hybrid charging regime); Changing the vehicle's speed or track to avoid tire noise in (semi)autonomous vehicles; etc.

In one or more embodiments, the present invention uses a database of signals generated by similar vehicles in similar environments to help to identify the cases where the resonant noise is caused by the vehicle.

Figure 5:
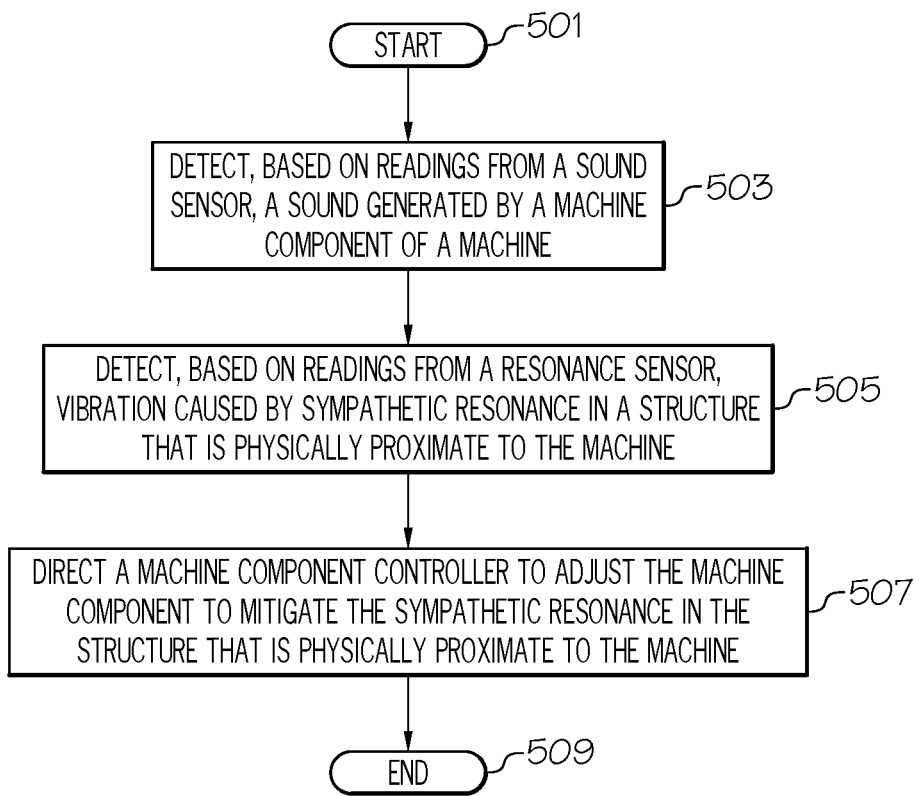
FIG. 5 is a high-level flow chart illustrating a process in accordance with one or more embodiments of the present invention.

With reference now to FIG. 5, a high-level flow chart illustrating a process in accordance with one or more embodiments of the present invention is presented.

After initiator block 501, one or more processors (e.g., within the machine component controller 301 shown in FIG. 3), based on readings from a sound sensor (e.g., sound sensor 303 shown in FIG. 3) associated with a machine (e.g., machine 302 and/or vehicle 202 and/or SDV 402) detect a sound generated by a machine component (e.g., machine component 305, such as the engine, the tires, etc.) of the machine, as described in block 503. That is, the processors determine what is causing the sound/noise on the machine/vehicle.

As described in block 505, one or more processors, based on readings from a resonance sensor (e.g., resonance sensor 316 shown in FIG. 3) detect vibration caused by sympathetic resonance in a structure that is physically proximate to the machine, where the sympathetic resonance is caused by the sound generated by the machine component. That is, the resonance sensor 316 (e.g., a microphone, a laser Doppler vibrometer, etc.) detects that a nearby structure (e.g., window 208 shown in FIG. 2) is sympathetically vibrating.

As described in block 507, one or more processors direct a machine component controller (e.g., machine component controller 301 shown in FIG. 3) to adjust the machine component to mitigate the sympathetic resonance in the structure that is physically proximate to the machine. That is, the machine component controller will slow down, turn off, or otherwise adjust the machine component 305 that is producing the required frequency and intensity of sound that caused the sympathetic resonance.

The flow-chart ends at terminator block 509.

In one or more embodiments of the present invention, the one or more processors detect the vibration caused by the sympathetic resonance with a laser Doppler vibrometer (which detects vibration of a remote structure by measuring Doppler shifts in coherent light as the coherent light is bounced off the remote structure).

In one or more embodiments of the present invention, the sympathetic resonance generates a sympathetic sound. That is, the sympathetic vibration of the glass, wall, etc. near the machine that is making the initial noise/sound is strong enough to create its own noise/sound. As such, this sympathetic sound (and thus the sympathetic vibration) is detected with a microphone.

In one or more embodiments of the present invention, the machine is a vehicle (e.g., vehicle 202 shown in FIG. 2). Assume now that the sound from the vehicle is generated by a contact of tires 212 on the vehicle with pavement 204 upon which the vehicle is traveling, as shown in FIG. 2. In this embodiment, one or more processors (e.g., within SDV on-board computer 401 if vehicle 202 is an SDV 402, or else machine component controller 301 if vehicle 202 is not an SDV) direct a vehicle controller (e.g., SDV control processor 403 or machine component controller 301) on the vehicle to modify movement of the vehicle on the pavement. That is, if vehicle 202 is not an SDV, then machine component controller 301 can at least cause the vehicle 202 to slow down, switch to electric power (from gas power), etc. in order to change the frequency and/or reduce the intensity (volume) of the sound being generated by the vehicle 202. However, if vehicle 202 is an SDV, then SDV control processor 403 can cause the SDV to slow down, switch to electric power, move over to a smoother part of a roadway, etc. in order to change the frequency and/or reduce the intensity (volume) of the sound being generated by the SDV.

Thus, in one or more embodiments of the present invention, the machine is a hybrid vehicle that contains a combustion engine and an electric motor for propulsion of the hybrid vehicle. Therefore, in response to detecting the vibration caused by the sympathetic resonance in the structure that is physically proximate to the machine, one or more processors direct a controller on the vehicle to stop the combustion engine and to switch to the electric motor for propulsion of the hybrid vehicle. That is, the on-board controller will switch from gas power to electric power.

In one or more embodiments of the present invention, the machine is a vehicle that contains a combustion engine and a continuously variable transmission (CVT). Assume now that the combustion engine generates the sound that causes the sympathetic resonance in the structure, and that the vehicle is traveling at an initial velocity. In response to detecting the vibration caused by the sympathetic resonance in the structure that is physically proximate to the machine, one or more processors direct a controller on the vehicle to simultaneously adjust the CVT while altering revolutions per minute (RPMs) of the combustion engine in order to maintain the initial velocity of the vehicle and to alter the sound generated by the combustion engine.

That is, a CVT is a transmission that has a nearly unlimited number of gear ratios provided by dynamically changing input and output gears. That is, a CVT has an input pulley (that takes power from the engine) and an output pulley (that delivers power to the vehicle's wheels) that are mechanically coupled by a (metallic or hard rubber) belt. The inner surfaces of the input pulley and the output pulley are adjustable, such that the gear ratio between the input pulley and the output pulley are able to vary in non-discrete intervals (i.e., "continuously"). As such, the CVT can deliver the same speed to the output pulley from a lower speed in the input pulley (and thus a lower RPM from the engine) by varying the gear ratio between the input pulley and the output pulley. Thus, adjusting the gear ratio in the CVT allows the system to maintain the same velocity/speed for the vehicle while slowing down or speeding up (and thus quieting) the engine on the vehicle.

In one or more embodiments of the present invention, the machine is referred to as a "first machine". One or more processors retrieve mitigation instructions from a mitigation instruction server (e.g., mitigation instructions server 307 shown in FIG. 3). These mitigation instructions describe steps taken by other machines to mitigate the sympathetic resonance in structures that are physically similar to the structure that is physically proximate to the first machine. One or more processors then execute the mitigation instructions from the mitigation instructions server for the first machine.

For example, assume that vehicle 202 is traveling by building 210 shown in FIG. 2. Assume now that many other vehicles, which may or may not be the same type of vehicle as vehicle 202, have been able to reduce or eliminate (mitigate) the amount of sympathetic vibration induced on the window 208 by avoiding any operation that causes a certain frequency and/or intensity of sound to be emitted therefrom. For example, assume that other vehicles passing by building 210 have determined that by avoiding generating any sounds between 100 and 500 hertz, particularly at less than 80 decibels, will not cause window 208 to sympathetically vibrate. Thus, mitigation instructions server 307 will 1) send a message identifying these frequencies and/or loudness to the vehicle 202, and/or 2) if the mitigation instructions server 307 knows the architecture of vehicle 202, will issue instructions to ensure that vehicle 202 never makes such a sound while traveling by building 210.

That is, mitigation instructions server 307 may simply send a message to vehicle 202 that says "Avoid any operations that will generate a sound between 100 and 500 hertz at more than 80 decibels". An on-board computer (e.g., machine component controller 301 or SDV on-board computer 401) will then monitor its sound level, and will autonomously determine what machine components (e.g., machine component 305 such as an engine) needs to be adjusted (e.g., slowed down) in order to stay within these parameters.

However, machine component controller 301 or SDV on-board computer 401 sends the mitigation instructions server 307 1) an identity of vehicle 202 and/or its components, 2) current vibration/sensor readings for vehicle 202, and 3) current resonance sensor readings for the SRS 308, and if the mitigation instructions server 307 knows what type of material SRS 308 is made of (i.e., by matching a GPS reading showing where vehicle 202 is currently located and using a lookup table to identify the features of SRS 308), then the mitigation instructions server 307 can send instructions back to vehicle 202 directing the machine component controller 301 or SDV on-board computer 401 to perform specific steps (e.g., slowing down the engine, adjusting the CVT, moving over to a smoother part of the roadway, etc.) in order to reduce the amount of sympathetic vibration being experienced by the SRS 308.

In one or more embodiments of the present invention, the method described herein (and/or the program instructions used to perform the method) is implemented as a cloud-based service.

The present invention may be implemented in one or more embodiments using cloud computing. Nonetheless, it is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
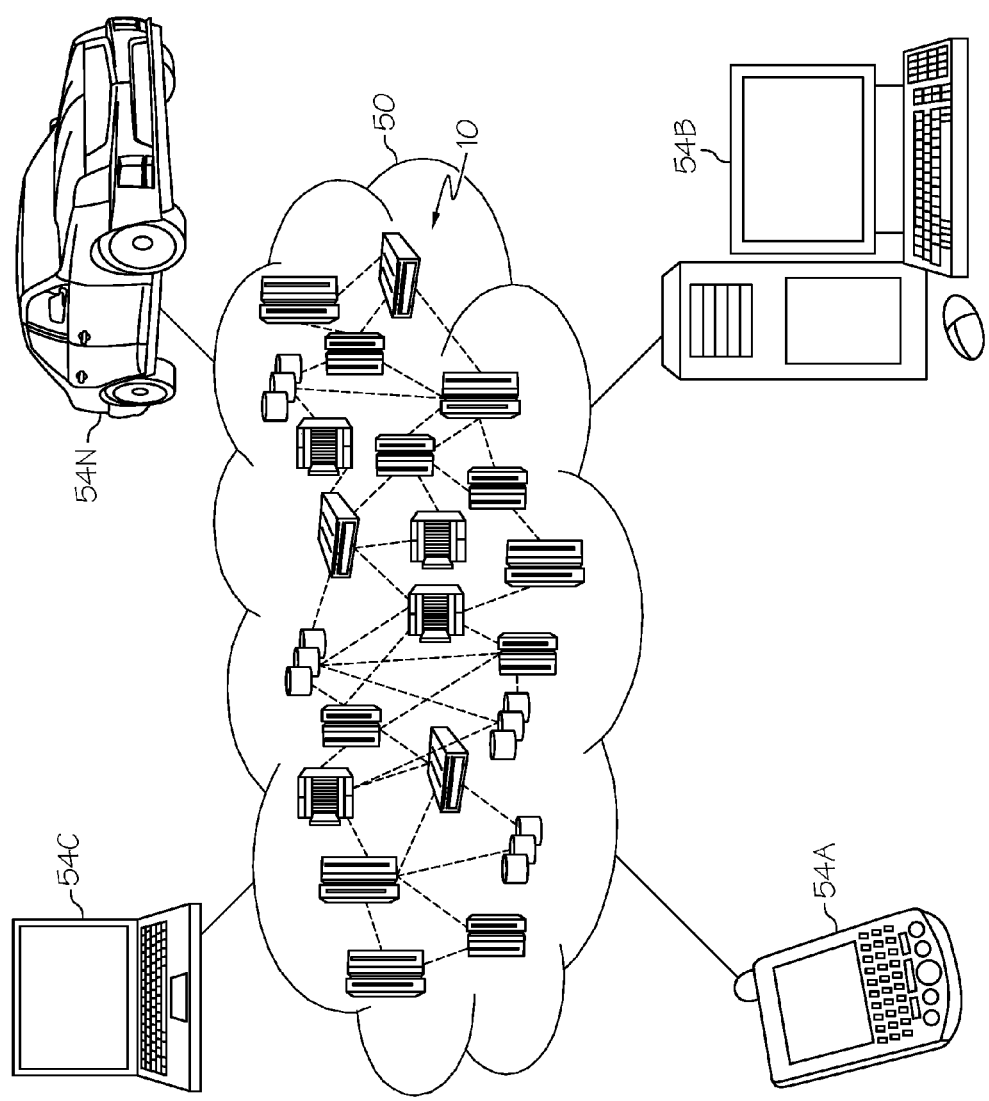
FIG. 6 depicts a cloud computing environment according to an embodiment of the present invention.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 6 are intended to be illustrative only and that computing nodes 10 and cloud computing environment 50 can communicate with any type of computerized device over any type of network and/or network addressable connection (e.g., using a web browser).

Figure 7:
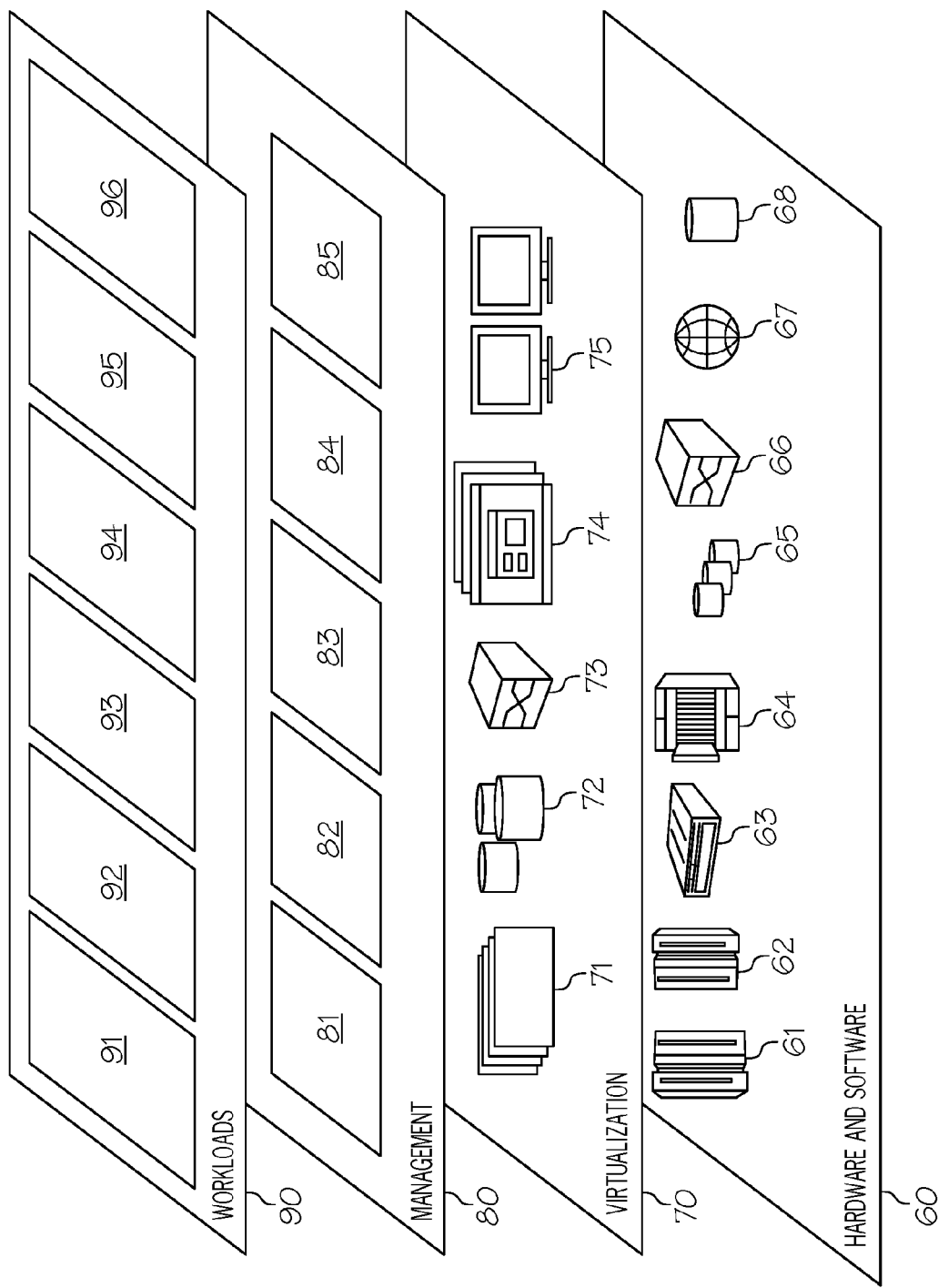
FIG. 7 depicts abstraction model layers of a cloud computer environment according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and sympathetic vibration mitigation processing 96 in accordance with one or more embodiments of the present invention as described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A computer-implemented method comprising:
   detecting, by one or more processors and based on readings from a sound sensor associated with a machine, a sound generated by a machine component of the machine;
   detecting, by one or more processors and based on readings from a resonance sensor, vibration caused by sympathetic resonance in a structure that is physically proximate to the machine, wherein the sympathetic resonance is caused by the sound generated by the machine component; and directing, by one or more processors, a machine component controller to adjust the machine component to mitigate the sympathetic resonance in the structure that is physically proximate to the machine.

2. The computer-implemented method of claim 1, further comprising:
   detecting, by one or more processors, the vibration caused by the sympathetic resonance with a laser Doppler vibrometer.

3. The computer-implemented method of claim 1, wherein the sympathetic resonance generates a sympathetic sound, and wherein the computer-implemented method further comprises:
   detecting, by one or more processors, the sympathetic sound with a microphone.

4. The computer-implemented method of claim 1, wherein the machine is a vehicle, wherein the sound is generated by a contact of tires on the vehicle with pavement upon which the vehicle is traveling, and wherein the computer-implemented method further comprises:
   directing, by one or more processors, modification movement of the vehicle on the pavement.

5. The computer-implemented method of claim 1, wherein the machine is a hybrid vehicle that contains a combustion engine and an electric motor for propulsion of the hybrid vehicle, and wherein the computer-implemented method further comprises:
   in response to detecting the vibration caused by the sympathetic resonance in the structure that is physically proximate to the machine, directing, by one or more processors, a controller on the vehicle to decrease use of the combustion engine and to increase use of the electric motor for propulsion of the hybrid vehicle.

6. The computer-implemented method of claim 1, wherein the machine is a vehicle that contains a combustion engine and a continuously variable transmission (CVT), wherein the combustion engine generates the sound that causes the sympathetic resonance in the structure, wherein the vehicle is traveling at an initial velocity, and wherein the computer-implemented method further comprises:
   in response to detecting the vibration caused by the sympathetic resonance in the structure that is physically proximate to the machine, directing, by one or more processors, a controller on the vehicle to simultaneously adjust the CVT while altering revolutions per minute (RPMs) of the combustion engine in order to maintain the initial velocity of the vehicle and to alter the sound generated by the combustion engine.

7. The computer-implemented method of claim 1, wherein the machine is a first machine, and wherein the computer-implemented method further comprises:
   receiving, by one or more processors, mitigation instructions from a mitigation instruction server, wherein the mitigation instructions describe steps taken by other machines to mitigate the sympathetic resonance in structures that are physically similar to the structure that is physically proximate to the first machine; and
   executing, by one or more processors, the mitigation instructions from the mitigation instructions server for the first machine.

8. The computer-implemented method of claim 1, wherein the method is implemented as a cloud-based service.

9. A computer program product for mitigating sympathetic resonance in a structure caused by a proximate machine, the computer program product comprising a computer readable storage medium having program instructions embodied therewith, the program instructions readable and executable by a processor to cause the processor to:
   detect, based on readings from a sound sensor associated with a machine, a sound generated by a machine component of the machine;
   detect, based on readings from a resonance sensor, vibration caused by sympathetic resonance in a structure that is physically proximate to the machine, wherein the sympathetic resonance is caused by the sound generated by the machine component; and
   adjust, via a machine component controller, the machine component to mitigate the sympathetic resonance in the structure that is physically proximate to the machine.

10. The computer program product of claim 9, wherein the program instructions are further readable and executable by the processor to cause the processor to:
    detect the vibration caused by the sympathetic resonance with a laser Doppler vibrometer.

11. The computer program product of claim 9, wherein the machine is a vehicle, wherein the sound is generated by a contact of tires on the vehicle with pavement upon which the vehicle is traveling, and wherein the program instructions are further readable and executable by the processor to cause the processor to:
    modify movement of the vehicle on the pavement.

12. The computer program product of claim 9, wherein the machine is a hybrid vehicle that contains a combustion engine and an electric motor for propulsion of the hybrid vehicle, and wherein the program instructions are further readable and executable by the processor to cause the processor to:
    in response to detecting the vibration caused by the sympathetic resonance in the structure that is physically proximate to the machine, decrease use of the combustion engine and increase use of the electric motor for propulsion of the hybrid vehicle.

13. The computer program product of claim 9, wherein the machine is a vehicle that contains a combustion engine and a continuously variable transmission (CVT), wherein the combustion engine generates the sound that causes the sympathetic resonance in the structure, wherein the vehicle is traveling at an initial velocity, and wherein the program instructions are further readable and executable by the processor to cause the processor to:
    in response to detecting the vibration caused by the sympathetic resonance in the structure that is physically proximate to the machine, simultaneously adjust the CVT while altering a level of revolutions per minute of the combustion engine in order to maintain the initial velocity of the vehicle and to alter the sound generated by the combustion engine.

14. The computer program product of claim 9, wherein the program instructions are provided as a service in a cloud environment.

15. A system comprising:
    one or more processors;
    one or more computer readable memories operably coupled to the one or more processors; one or more computer readable storage mediums operably coupled to the one or more computer readable memories; and
    program instructions stored on at least one of the one or more computer readable storage mediums for execution by at least one of the one or more processors via at least one of the one or more computer readable memories, the program instructions comprising:

program instructions configured to detect, based on readings from a sound sensor associated with a machine, a sound generated by a machine component of the machine;

program instructions configured to detect, based on readings from a resonance sensor, vibration caused by sympathetic resonance in a structure that is physically proximate to the machine, wherein the sympathetic resonance is caused by the sound generated by the machine component; and program instructions configured to adjust sound coming from the machine component in order to mitigate the sympathetic resonance in the structure that is physically proximate to the machine.

16. The system of claim 15, further comprising:

program instructions configured to detect the vibration caused by the sympathetic resonance with a laser Doppler vibrometer.

17. The system of claim 15, wherein the sympathetic resonance generates a sympathetic sound, and wherein the system further comprises:

program instructions configured to detect the sympathetic sound with a microphone.

18. The system of claim 15, wherein the machine is a vehicle, wherein the sound is generated by a contact of tires on the vehicle with pavement upon which the vehicle is traveling, and wherein the system further comprises:

program instructions configured to modify movement of the vehicle on the pavement.

19. The system of claim 15, wherein the machine is a hybrid vehicle that contains a combustion engine and an electric motor for propulsion of the hybrid vehicle, and system further comprises:

program instructions configured to, in response to detecting the vibration caused by the sympathetic resonance in the structure that is physically proximate to the machine, modify a level of revolutions per minute of the combustion engine and use of the electric motor for propulsion of the hybrid vehicle.

20. The system of claim 15, wherein the machine is a vehicle that contains a combustion engine and a continuously variable transmission (CVT), wherein the combustion engine generates the sound that causes the sympathetic resonance in the structure, wherein the vehicle is traveling at an initial velocity, and wherein the system further comprises:

program instructions configured to, in response to detecting the vibration caused by the sympathetic resonance in the structure that is physically proximate to the machine, simultaneously adjust the CVT while altering a level of revolutions per minute of the combustion engine in order to maintain the initial velocity of the vehicle and altering the sound generated by the combustion engine.

21. A computer-implemented method comprising:

detecting, by one or more processors and based on readings from a sound sensor associated with a machine, a sound generated by a machine component of the machine;

detecting, by one or more processors and based on readings from a resonance sensor, vibration caused by sympathetic resonance in a structure that is physically proximate to the machine, wherein the sympathetic resonance is caused by the sound generated by the machine component; and directing, by one or more processors, a machine component controller to adjust the sound coming from the machine component in order to mitigate the sympathetic resonance in the structure that is physically proximate to the machine.

22. The computer-implemented method of claim 21, further comprising:

detecting, by one or more processors, the vibration caused by the sympathetic resonance with a laser Doppler vibrometer.

23. The computer-implemented method of claim 21, wherein the machine is a hybrid vehicle that contains a combustion engine and an electric motor for propulsion of the hybrid vehicle, and wherein the computer-implemented method further comprises:

in response to detecting the vibration caused by the sympathetic resonance in the structure that is physically proximate to the machine, directing, by one or more processors, a controller on the vehicle to disengage the combustion engine and to engage the electric motor for propulsion of the hybrid vehicle.

24. A computer-implemented method comprising:

detecting, by one or more processors and based on readings from a sound sensor associated with a vehicle, a sound generated by a vehicle;

detecting, by one or more processors and based on readings from a resonance sensor, vibration caused by sympathetic resonance in a structure that is physically proximate to the vehicle, wherein the sympathetic resonance is caused by the sound generated by the vehicle; and directing, by one or more processors, a vehicle controller to adjust an operation of the vehicle in order to mitigate the sympathetic resonance in the structure that is physically proximate to the vehicle.

25. The computer-implemented method of claim 23, wherein the vehicle is a hybrid vehicle that contains a combustion engine and an electric motor for propulsion of the hybrid vehicle, and wherein the computer-implemented method further comprises:

in response to detecting the vibration caused by the sympathetic resonance in the structure that is physically proximate to the vehicle, directing, by one or more processors, a controller on the vehicle to decrease use of the combustion engine and to increase use of the electric motor for propulsion of the hybrid vehicle.

* * * * *